Aug. 27, 1929.                E. A. ODIN                1,726,039
                           CLAMPING DEVICE
                      Original Filed Sept. 7, 1926
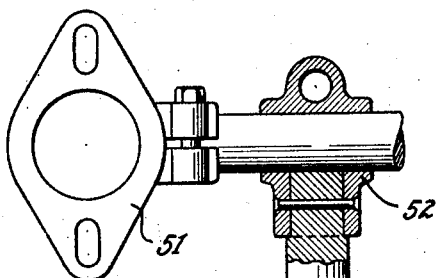
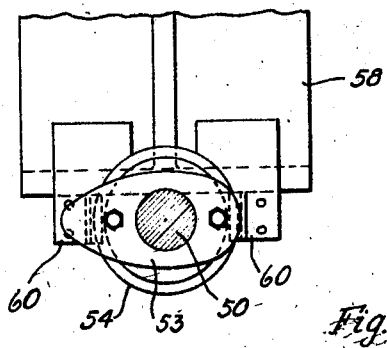
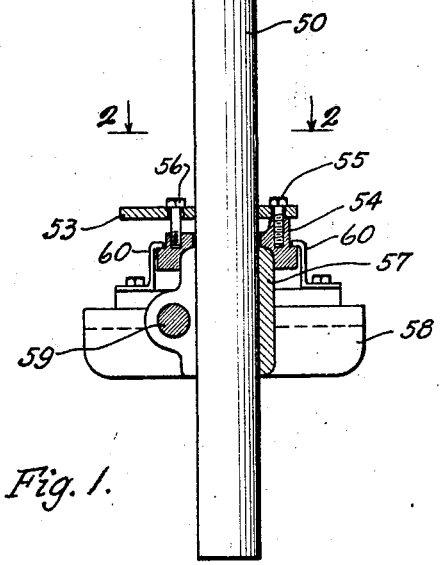
Fig. 2.
Fig. 1.
INVENTOR:
Eugene A. Odin
By E. J. Andrews
          Att'y.

Patented Aug. 27, 1929.

1,726,039

UNITED STATES PATENT OFFICE.

EUGENE A. ODIN, OF CHICAGO, ILLINOIS.

CLAMPING DEVICE.

Application filed September 7, 1926, Serial No. 133,881. Renewed January 25, 1929.

My invention is concerned with clamping devices designed primarily for use as a part of universal vises of the type shown in my application No. 204,564, filed July 9, 1927, for universal vises, but which clamping devices are capable of use elsewhere.

It consists fundamentally of a fixed collar, preferably split, so that it can be used as a clamping collar, in which a rod can rotate or slide freely in either direction (assuming that the collar is not clamped on the rod, which can preferably be done), together with a second collar rotatable on the first, but held in engagement therewith, and in which the rod can rotate or slide freely in either direction, together with a cramping member embracing the rod and connected to the second collar, so that while the rod may be rotated or moved axially in one direction relative to the cramping member, it cannot be so moved in the other direction unless the cramping member be manipulated to permit said movement.

To illustrate my invention, I annex hereto a sheet of drawings, in which the same reference characters are used to designate identical parts in all the figures, of which,—

Fig. 1 is a side elevation, partly in central vertical section, of clamping means embodying my invention; and Fig. 2 is a plan view in section on the line 2—2 of Fig. 1.

My invention is adapted primarily for use in connection with a bench (not shown), upon one side of which is secured the base casting 58, adapted to be placed on the side of the bench and secured thereto by any desired means so as to produce a perfectly rigid structure. The outer end of said base member 58 is provided with a split collar 57, having a pair of ears on each side of the split, through one of which is threaded the customary screw rod 59, so that by turning said rod 59 with the customary handle, the clamping jaws constituting the collar 57 may be clamped to the rod 50, which is, when the screw 59 is loosened, adapted to rotate or slide up and down in said collar.

The upper end of the collar 57 may be rounded off, as shown, and has resting thereon the second collar 54, the under side of which is preferably shaped to conform to the top of the collar 57 so that the collar 54 can rotate freely on top of the collar 57. For most uses, it is desired to prevent the upward movement of the collar 54 away from the collar 57, and for this purpose, I secure on top of the casting 58 the pair of brackets 60, which overhang the annular shoulder formed on the collar 54, so that while said collar 54 is free to rotate on the collar 57, it can not be lifted upwardly therefrom. The cramping member 53 preferably consists of an oval-shaped plate or disk having a central aperture just large enough for the rod 50 to slide freely therethrough when the plate 53 is at right angles to the axis of the rod. This cramping member 53 is held at its shorter end loosely upon an abutment extending above the average height of the collar 54 by a screw 55 passed through an aperture in the cramping member and threaded into said abutment. There is sufficient play between the abutment and the head of the screw 55 so that the cramping member 53 is free to tilt slightly, i. e., enough to cramp on the rod 50. To limit this cramping movement to one direction, I provide a screw 56 which is passed through an aperture slightly larger than the diameter of the screw formed in the cramping member 53 and threaded into the collar 54 just far enough so that when the adjacent end of the cramping member 53 is lifted up until it contacts with the head of the screw 56, the cramping member 53 will be at right angles to the axis of the rod 50, which can then be shoved downward through the two collars, assuming, of course, that the screw 59 is at the time loosened. If, however, the cramping member 53 is not held up, as previously described, and an attempt be made to shove down the rod 50, the cramping member will immediately come into action and swing far enough from its position at right angles to the axis of the rod 50 so as to cramp the same and prevent any downward movement thereof.

The rod 50 may be used to support any desired mechanism, it being shown as provided at its upper end with a split clamping collar 52 to clamp a horizontal rod passing therethrough and carrying any desired device 51 upon which work is to be done. To quickly adjust the same to the proper height, assuming the screw 59 is loosened, all that is necessary is to pull up on the rod 50. The cramping device prevents the rod falling, even under hammering blows, and to bring the device 51 into the proper horizontal position, all that is necessary is to rotate the rod 50 on its axis by swinging the device 51. Its distance from the shaft 50 may be, of course, regulated by releasing the clamp 52 and shoving it in or out. When the position finally desired is secured, the screw 59 is tightened up, as well as the screw for the clamp 52, and the device is then ready to be operated on.

While I have shown and described my invention as embodied in the form which I at present consider best adapted to carry out its purposes, it is capable of modifications, and I do not desire to be limited in the interpretation of the following claims except as may be necessitated by the state of the prior art.

What I claim as new, and desire to secure by Letters Patent of the United States, is:

1. Clamping means comprising a fixed collar, a rod vertically, rotatably and slidably mounted in the bore of said collar, a second collar rotatably mounted on said collar, and a plate having an opening therethrough tiltably connected to said second collar and with the said rod passing through said opening.

2. Clamping means comprising a split collar adapted to be fixed to a bench with its axis vertical, a rod slidably and rotatably mounted in the bore of said collar, a second collar rotatably but non-slidably mounted on said split collar, a third collar mounted on said rod over said second collar and tiltably connected with said second collar with one side permanently spaced from said second collar.

3. Clamping means as claimed in claim 2, means for clamping said split collar tightly against said rod.

In testimony whereof, I hereunto set my hand.

EUGENE A. ODIN.